(12) United States Patent
Peterson et al.

(10) Patent No.: US 9,384,074 B1
(45) Date of Patent: Jul. 5, 2016

(54) REDIRECTING SERVICE CALLS USING ENDPOINT OVERRIDES

(71) Applicant: Amazon Technologies, Inc., Seattle, WA (US)

(72) Inventors: Kyle Bradley Peterson, Seattle, WA (US); George Okoth Oburu, Bothell, WA (US); Vinay Babubhai Patel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 51 days.

(21) Appl. No.: 14/036,131

(22) Filed: Sep. 25, 2013

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC .................................. G06F 9/547 (2013.01)

(58) Field of Classification Search
None
See application file for complete search history.

(56) References Cited

U.S. PATENT DOCUMENTS

| | | | |
|---|---|---|---|
| 2004/0117759 A1* | 6/2004 | Rippert et al. | 717/100 |
| 2005/0044197 A1* | 2/2005 | Lai | 709/223 |
| 2010/0085959 A1* | 4/2010 | Vohra et al. | 370/352 |
| 2012/0096183 A1* | 4/2012 | Mercuri | 709/241 |
| 2014/0280950 A1* | 9/2014 | Bhanujan et al. | 709/226 |

OTHER PUBLICATIONS

Web article: "Apache CXF Software Architecture Guide" [online][retrieved on: Sep. 24, 2013] retrieved from: http://cxf.apache.org/docs/cxf-architecture.html , 8 pps.

* cited by examiner

*Primary Examiner* — Craig Dorais
(74) *Attorney, Agent, or Firm* — Robert C. Kowert; Meyertons, Hood, Kivlin, Kowert & Goetzel, P.C.

(57) ABSTRACT

Technologies are described herein for redirecting service calls via endpoint overrides in a service-oriented system. A request is received for a service implemented in the service-oriented system. The request is then analyzed to identify a service key for the requested service. A service endpoint is obtained for the requested service using the service key from a configuration file. The request is further analyzed to determine if an override endpoint for the requested service is provided. If the request contains the override endpoint, a service call to the service identified by the override endpoint is invoked. Otherwise, the service specified by the service endpoint is called for the requested service.

20 Claims, 6 Drawing Sheets

REDIRECTING SERVICE CALLS USING ENDPOINT OVERRIDES

BACKGROUND

Software testing is a process of validating and verifying that a computer program meets the requirements that guided its design and development and that the program works as expected. The testing process typically involves testing the operation of the program at various levels. For example, unit testing may be utilized to verify the functionality of a specific unit or a component of the program, whereas integration testing seeks to verify the interfaces between components against a software design by combining individual software components/modules and testing them as a group.

In a service-oriented system, where a large number of software components or services may be involved, integration testing can become challenging. Without a careful design, changes to the system as a result of the testing might cause unpredictable effects to the system and render other operations on the system unreliable. For example, integration testing in a service-oriented system may be performed by installing a service under test directly into the system and/or replacing an existing service. However, installing a service with potential defects into the system might affect other unrelated tests and/or systems, thereby providing false positives to unrelated tests or even causing test failures.

Better results may be achieved by performing integration testing in an integration environment where changes made by the testing are isolated from the rest of the system. In order to accomplish this, an integration stack may be created by building an instance for each of the services involved in the testing of the service under test. These instances allow testing to be performed in a separate environment that does not affect the services currently running in the production system. Such an integration stack, however, can be expensive to set up and may have a high maintenance cost and a low efficiency due to largely redundant instances in the integration stack.

The disclosure made herein is presented with respect to these and other considerations.

DETAILED DESCRIPTION

Figure 1:
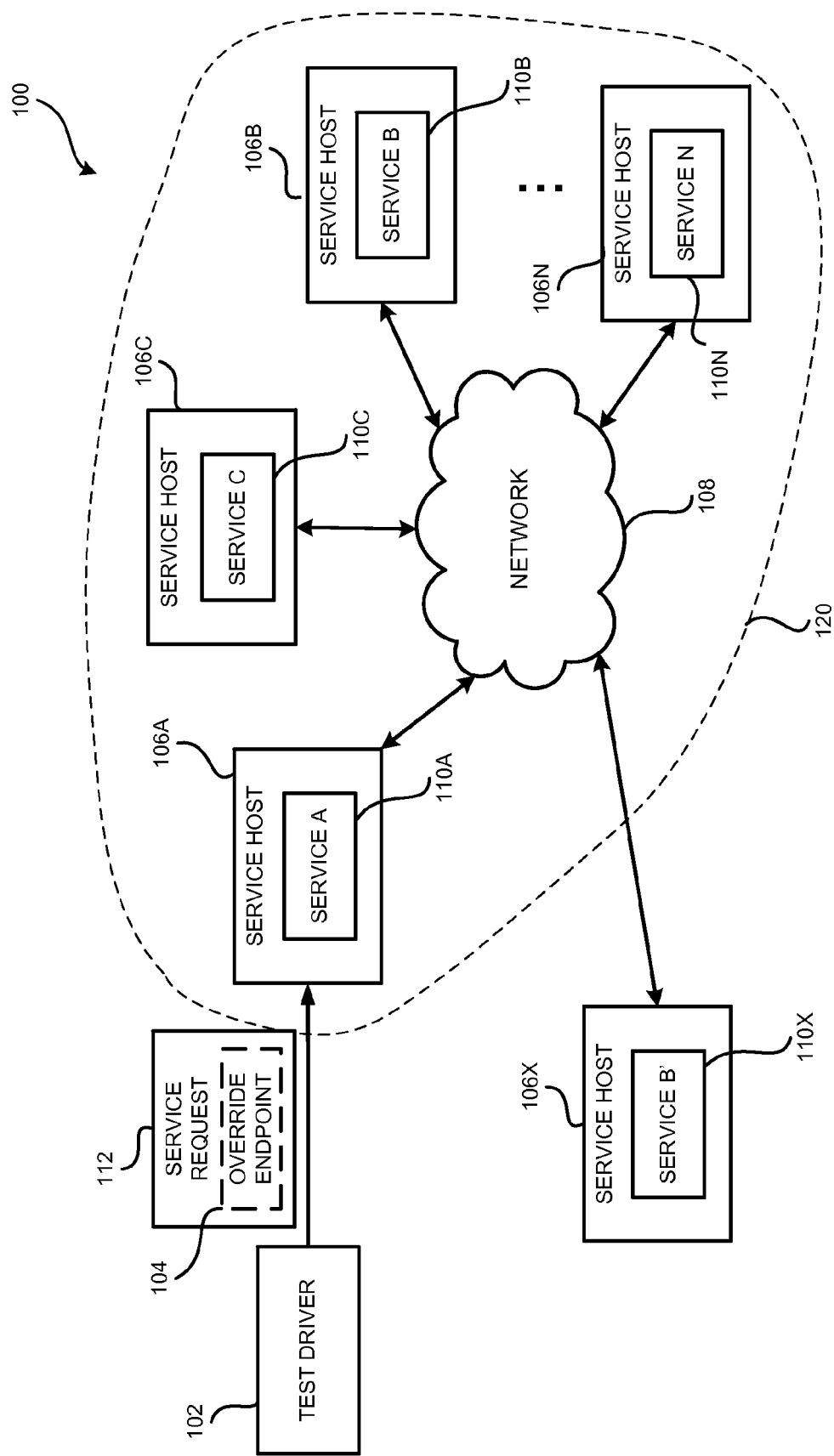
FIG. 1 is a system diagram showing aspects of an illustrative operating environment for the embodiments disclosed herein for redirecting service calls using endpoint overrides.

The following detailed description is directed to technologies for redirecting service calls using endpoint overrides in a service-oriented system. Utilizing the technologies described herein, a call to a service implemented in a distributed service-oriented system can be redirected to an alternative service, such as a test version of a service, without affecting operation of other components in the system. The service call redirection can be made on a per call basis, and thus is flexible to be used in various scenarios. For example, software developers may utilize service call redirection in the manner presented herein for integration testing, which allows use of existing services in the system while isolating the service under test, and thus minimizing any negative effects caused by the testing.

According to one aspect presented herein, a computer-implemented mechanism is disclosed for redirecting service calls in a service-oriented system using endpoint overrides. In particular, a request for a service implemented by the service-oriented system may be received and analyzed to identify a service key for the requested service. The service key may then be utilized to obtain endpoint information for the requested service from a configuration file or from other resources containing the endpoint information for the requested service. As used herein, the term "endpoint" of a service refers to an entry point of that service. In embodiments, the endpoint may include a connection address of the service.

The request may be further analyzed to determine if it contains an override endpoint for the requested service. If the override endpoint is specified in the request, the specified endpoint may be overridden using the override endpoint, and the service may be called at the override endpoint. If the request does not contain the override endpoint, the service may be called at the endpoint specified in the configuration file. Additional details regarding the various components and processes described above for redirecting service calls in a service-oriented system using endpoint overrides will be presented below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable customer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 and the following description are intended to provide a brief, general description of a suitable computing environment in which the embodiments described herein may be implemented. In particular, FIG. 1 is a system diagram that shows an illustrative operating environment 100 that includes a service-oriented system 120 for redirecting service calls using endpoint overrides.

The service-oriented system 120 may include service hosts 106A-106N (which may be referred to individually as a service host 106 or collectively as the service hosts 106) connected through a network 108. The service host 106 shown in FIG. 1 may represent one or more web servers, application servers, network appliances, dedicated computer hardware devices, personal computers ("PC"), or any combination of these and/or other computing devices known in the art. The network 108 may be a local-area network ("LAN"), a wide-area network ("WAN"), the Internet, or any other networking topology known in the art that connects the service hosts 106.

Each of the service hosts 106A-106N may have one or more services 110A-110N executing thereon, which may be referred to individually as a service 110 or collectively as the services 110. As used herein, "services" refer to discrete software modules or programs that can collectively provide a complete functionality of a large software application. Each service implements at least one action, such as authenticating customers, or charging a customer credit card in a service-oriented merchant system.

Services 110 can exchange information, for example, through service calls with any other services 110 within the system 120 when needed. Service calls among various services can be described using a service call graph, which illustrates the call dependencies among the services in the system. For example, in the service-oriented system 120 shown in FIG. 1, normal operations of the system may require service A 110A call service B 110B which in turn calls service C 110C. Additional details regarding an illustrative call graph will be provided below with regard to FIG. 3. Service calls may be realized through calling services at their corresponding addresses using protocols such as Hypertext Transfer Protocol ("HTTP").

As the service-oriented system 120 evolves, one or more services 110 may need to be updated, for example, to include a new feature or to implement an optimized version of the services. To ensure that the updated service-oriented system 120 functions properly, the updated services may need to be tested before integrating the updated services into the system 120 to replace existing services. FIG. 1 illustrates a service B' 110X hosted by a service host 106X as a test version of service B 110B. To facilitate testing, the service host 106X hosting service B' 110X may be connected to the service-oriented system 120 and a test program, such as the test driver 102, may be employed for testing, such as issuing a service request 112 to the service-oriented system 120 to test the functionality of service B' 110X in the service-oriented system 120.

The test driver 102 may be running on a personal computer ("PC"), a laptop, a notebook, a personal digital assistant ("PDA"), a game console, a set-top box, an e-reader, a consumer electronics device, a smartphone, a tablet computing device, a server computer, or any other computing device capable of connecting to and communicating with the service hosts 106 of the service-oriented system 120. In some embodiments, the test driver 102 may be running on one or more of the service hosts 106 of the service-oriented system 120. While FIG. 1 illustrates that the service host 106X is located outside the service-oriented system 120, it should be understood that the service host 106X might also be executed on any of the service hosts 106 within the service-oriented system 120.

Depending on the functionality of a test service with respect to other services in the service-oriented system 120, a service call to the test service may involve multiple other services. For example, a service to be tested may provide functionality for verifying customer credit card information. To test such a service, a service for receiving the customer credit card information may need to be involved in the testing, and utilized to call the service for credit card information verification. As such, a service request 112 issued from the test driver 102 may be sent to a service other than the service to be tested. In FIG. 1, a service request 112 specifying the service B' 110X to be used in lieu of service B 110B may be sent by the test driver 102 to service A 110A hosted at service host 106A which in turn calls the service B' 110X.

To fulfill the service request 112, a mechanism referred to herein as "endpoint overrides" may be utilized. As mentioned above, normal operation of the service-oriented system 120 may require service A 110A to call service B 110B, which is typically implemented through service A 110A calling service B 110B at an endpoint of service B, referred to as a "service endpoint." As also briefly mentioned above, an endpoint of a service may include a connection address of the service. According to embodiments, the connection address may include a host identification, a port number and/or a path. A host identification, for instance, can be a host name represented by the domain name of a service host 106. It should be appreciated that the host identification may be represented in any format as along as the corresponding service host 106 in the service-oriented system 120 can be uniquely identified and located, such as using the Internet protocol ("IP") address of the service host 106. The port number and the path may also be specified in the endpoint to further locate the service 110 on the service host 106. It should be further noted that the mechanism for identifying an endpoint presented above is for illustration only and should not be construed as limiting. Other ways of representing endpoints of services might also be utilized.

With endpoint overrides, service A 110A may be provided with an endpoint directed to an alternative service B' 110X intended to be used in place of service B 110B. The service A 110A may then use this endpoint to override the service endpoint for service B and call the alternative service B' at the provided endpoint. The endpoint provided for the alternative service B' is referred to herein as an "override endpoint." Such an override endpoint 104 for the alternative service B' 110X may be included in the service request 112 sent to service A 110A to request service A 110A to employ the override endpoint 104 to call the alternative service B'. In some implementations, the override endpoint 104 may be stored in a data storage medium (not shown) accessible to service A 110A, and a token corresponding to the override endpoint 104 may be included in the service request 112. Upon receiving the service request 112, service A 110A may utilize the token to obtain the override endpoint 104 at the data storage medium, and to override existing service endpoint for service B using the override endpoint 104 to call service B'. It should be understood that the mechanism for providing an override endpoint presented above is for illustration only and should not be construed as limiting. Other ways of providing override endpoints to services might also be utilized.

Upon receiving the service request 112, service A 110A may recognize that a specific override endpoint 104 for service B' 110X has been provided and may, in turn, conduct a service call to service B' 110X at the override endpoint 104 instead of calling service B 110B. If, on the other hand, the service request 112 does not contain an override endpoint for service B' 110X, the service A will act as normal to direct service calls to service B 110B. In this way, the service-oriented system 120 can smoothly switch between a testing mode and a working mode by specifying or not specifying an override endpoint 104 of service B' 110X in the service request 112. While endpoint overrides for only one service have been described above, it should appreciated that endpoint overrides can be applied to any number of services in the service-oriented system 120 by properly specifying corresponding override endpoints in the service request 112. Additional details regarding redirecting service calls through endpoint overrides will be presented below with regard to FIGS. 2-6.

Figure 2:
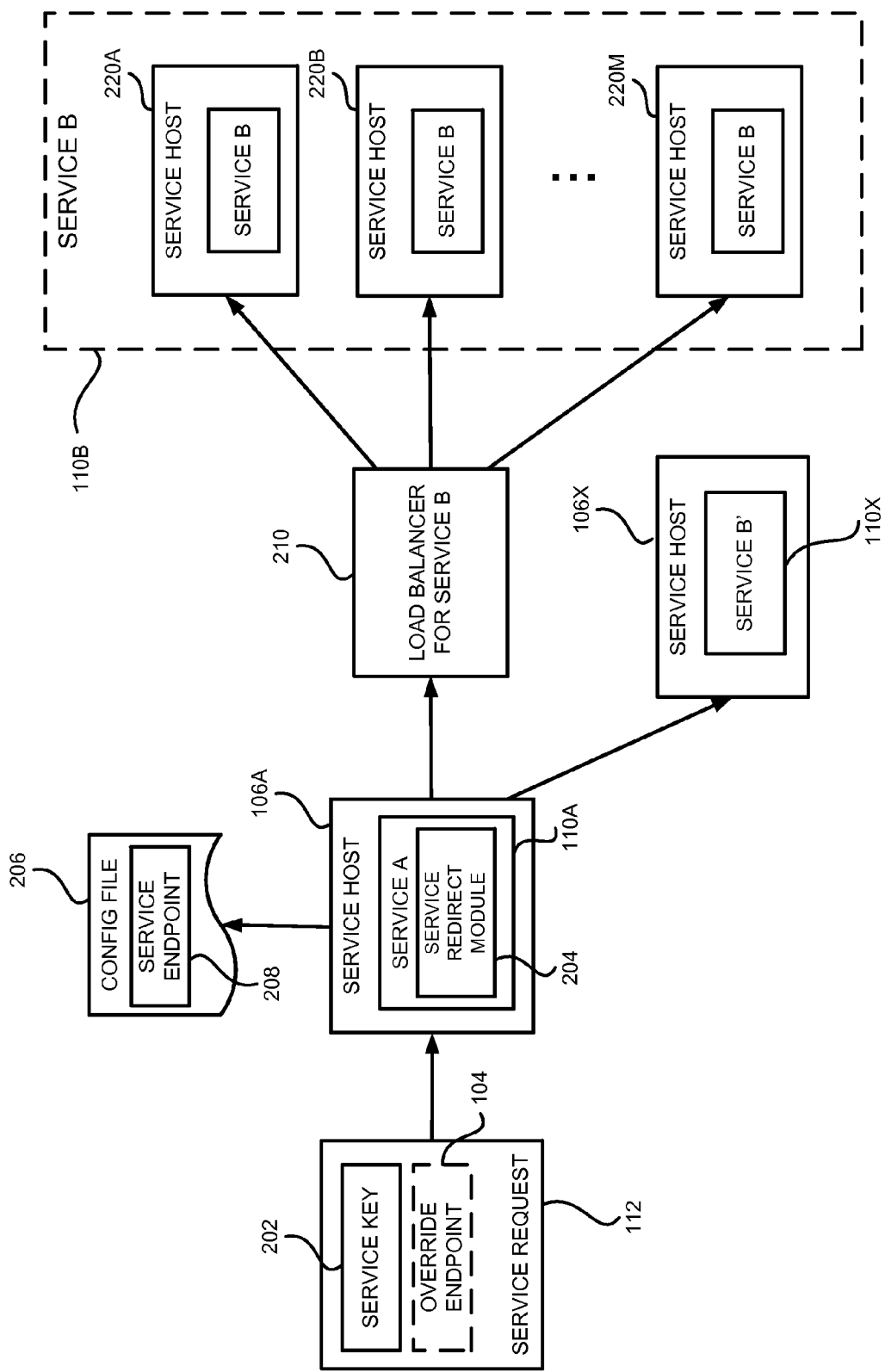
FIG. 2 is a block diagram illustrating aspects of one mechanism for processing a service call in one exemplary setup of a service-oriented system, according to embodiments presented herein.

FIG. 2 illustrates one exemplary configuration for the service-oriented system 120 shown in FIG. 1, according to embodiments presented herein. According to embodiments, a service, such as service B 110B, is provided by a set of service hosts 220A-220M, which may be referred to individually as a service host 220 or collectively as the service hosts 220. Each of the service hosts 220 executes the same corresponding service, such as service B 110B, and the service hosts 220 are managed by a load balancer 210 for balancing a load between each of service hosts 220. While FIG. 2 only illustrates the service B 110B, it should be understood that other services of the service-oriented system 120, such as service A 110A and service C 110C, may be implemented in a similar fashion.

FIG. 2 also illustrates a service call from service A 110A to service B 110B or service B' 110X in response to a service request 112 received at service A 110A. The service request 112 may contain a service key 202 identifying the service to be called. In the example illustrated in FIG. 2, where service B' 110X is a test version of service B 110B and provides similar functionality as service B 110B, the service keys for both services may be identical. In some embodiments, service names may be utilized as the service keys 202.

According to embodiments, the service request 112 may be a test request specifying an override endpoint 104 for service B' 110X or a regular request for service B 110B without the override endpoint 104. If the service request 112 is a regular request, service A 110A may use the service key 202 in the service request 112 to look in a configuration file 206 to identify a service endpoint 208 for service B 110B. Such service endpoint information may be part of a client configuration package that service B 110B provides to its clients, including service A 110A. As discussed above, the service endpoint 208 may include information identifying the address of the service. According to embodiments, such an address may include a host identification, a port number and/or a path. The host identification may be represented using an IP address of the service host 106. Alternatively, the host identification may be represented using a domain name for the service host 106, which may then be resolved by querying a domain name system ("DNS") server to obtain the IP address of the service host 106. Once the IP address of the service host 106 is obtained, the caller service, such as service A 110A, may then directly connect the service host 106 for the requested service via, for example, TCP/IP protocol.

In one embodiment, instead of providing the address of the service host 106, the address of a load balancer 210 for the corresponding service, such as the load balancer 210 for service B, may be provided in the configuration file 206. Accordingly, upon obtaining the address of the load balancer 210, service A will be routed to the load balancer 210, which further forwards the connection to one of the service hosts 220 based on the current load of each service host 220 to execute the requested service.

As discussed above, the service-oriented system 120 may be utilized to test the operation of a service by sending a service request 112 that includes an override endpoint 104 for a service to be tested, such as service B' 110X illustrated in FIG. 2. Similar to the service endpoint 208, the override endpoint 104 may contain the address of service B' 110X represented by a host identification, a port number and/or a path. For example, the override endpoint 104 may include the following information (in JavaScript Object Notation ("JSON") format):

"ServiceEndpoints"=>{
. . .
"HttpConnectionInfo.op-b-OrderPersistenceService-.USAmazon"=>{
"host_identification"=>"ordering-odss-stubbed-0101.sea3.company.com",
"port number"=>"7273", "path"=>"/ops-us/"}
. . .
}.

In the above example, "HttpConnectionInfo.op-b-OrderPersistenceService.USAmazon" is used as a service key 202 to identify the requested service B' 110X running on service host 106X. In FIG. 2, service B' 110X is a test version of the service B 110B, and thus may share the same service key 202 as service B 110B. Service A 110A, or more specifically a service redirect module 204 of service A implemented to handle endpoint overrides as illustrated in FIG. 2, may employ the service key 202 to identify the requested service and override the service endpoint 208 provided by the configuration file 206 with the override endpoint 104 specified in the service request 112. According to the above-illustrated override endpoint 104, a service call to the service "HttpConnectionInfo op-b-OrderPersistenceService.USAmazon" may be accessed at host "ordering-odss-stubbed-0101.sea3.company.com" (service host 106X) at port number "7273" under path "/ops-us/." Thus, rather than connecting to the load balancer 210 for service B, the service redirect module 204 may redirect the service call to service B' 110X at service host 106X. Various testing operations on service B' 110X may then be performed.

It should be appreciated that the service call redirection described above may be performed on a per call basis and the override endpoints may not be persisted across calls. In other words, in the example shown in FIG. 2, the override endpoint 104 may only be utilized in the service calls to service B' 110X initiated by the service request 112 containing the override endpoint 104. For calls initiated by other service requests, service calls may be directed to service B 110B, service B' 110X or even another version of service B, if available, depending on the content of the service requests 112. This property of the service call redirection allows the service-oriented system 120 to function as normal, such as by sending regular requests, and at the same time to be used for testing one or more services, such as by sending test requests, without significantly changing the existing configuration of the service-oriented system 120.

Figure 3:
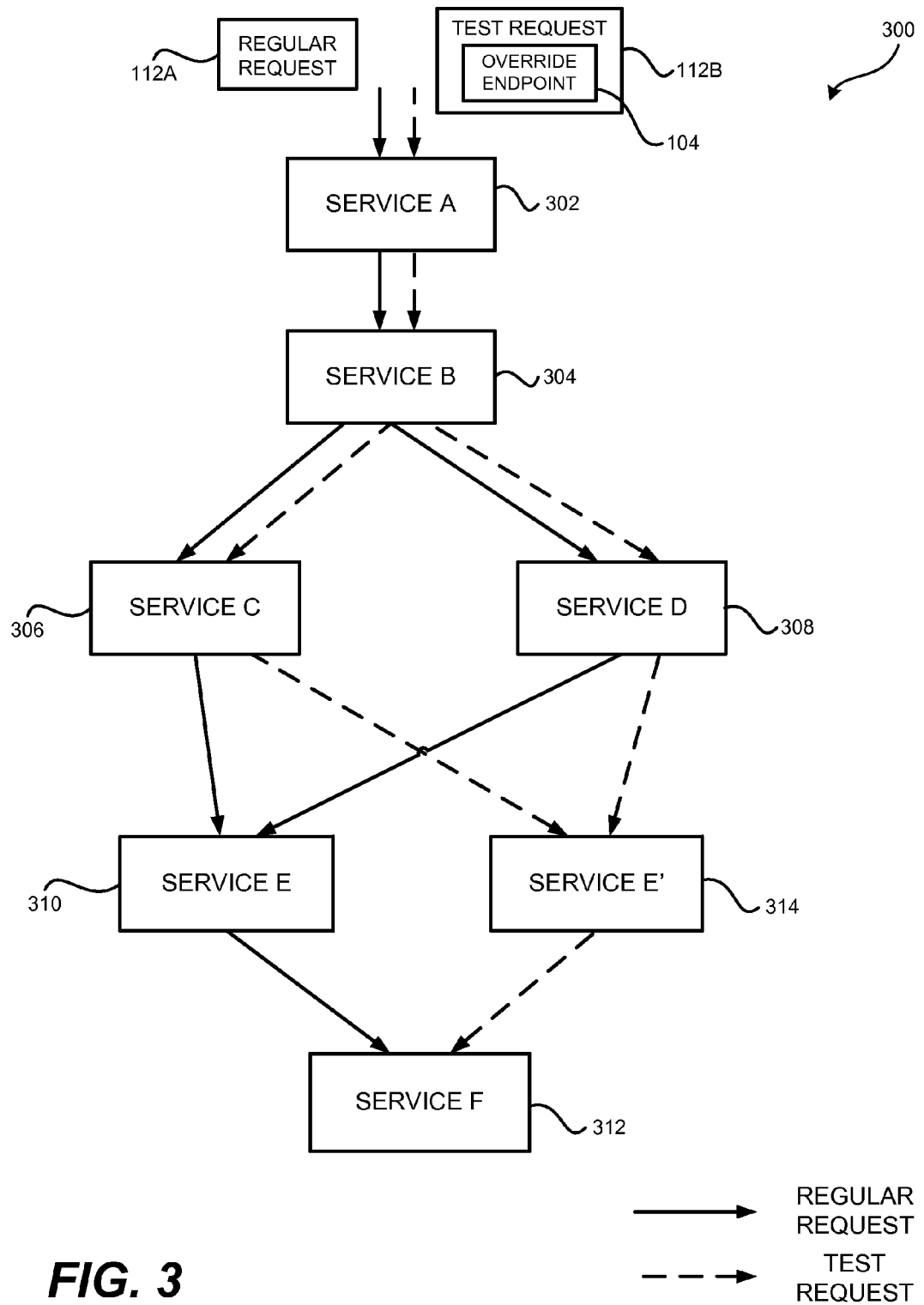
FIG. 3 is an exemplary service call graph for a regular service request and for a test service request, according to one embodiment disclosed herein.

Referring now to FIG. 3, exemplary service call graphs 300 for a regular service request 112A and a test service request 112B will be described. A service call graph may include a set of nodes. Each node represents a service implemented by the service-oriented system 120. An arrow pointing from one node to another node represents a service call from a service represented by one node to a service represented by the other node. For example, an arrow from node "service A" 302 to node "service B" 304 represents a service call from service A to service B. In FIG. 3, arrows with solid lines represent service calls initiated by a regular service request 112A, and arrows with dotted lines represent service calls initiated by a test service request 112B that utilizes the endpoint redirection mechanism described herein.

The call graph 300 illustrated in FIG. 3 involves six services: service A 302 to service F 312. Each of these services may be running on a service host 106 or on a set of service hosts 220 managed by a load balancer 210 as illustrated in FIG. 2. For example, service E may be running on a set of service hosts 220 named "service-e-prod-101," "service-e-prod-102," . . . and so on, and managed by a load balancer named "service-e-prod."

When a regular request 112A is received at service A 302, according to the call graph 300, a service call from service A 302 to service B 304 may be triggered, which may further trigger a service call to each of service C 306 and service D 308. Both service C 306 and service D 308 may then call service E 310, which may further make a service call to service F 312. If the services are implemented on a set of service hosts 220 managed by a load balancer 210, the service calls may be directed to the corresponding load balancer 210, which may further forward the service calls to one of the service hosts 220 based on the current load of service hosts 220.

In FIG. 3, the service E 310 has an alternative version, service E' 314, which may provide the same or similar functionality as service E. For instance, service E' may be an optimized implementation of service E based on the current hardware specifications, or may be a faster implementation of service E based on an improved algorithm. As discussed above, the service E' 314 may be running on a service host in the service-oriented system 120 or on a separate host, for example on host "service-e-test-101," that is different from any of the service hosts 220 in the service-oriented system 120.

For testing purposes, service E' 314 may be connected to the service-oriented system 120 and made available to other services in the system 120. A test request 112B may then be issued, such as by the test driver 102. According to embodiments, the test request 112B may contain an override endpoint 104 specifying the entry point of service E'. The override endpoint 104 may specify an address of the service E' which may include a host identifier, for example, host name "service-e-test-101," a port number and a path. The override endpoint 104 may be passed to service C 306 and service D 308 by service A 302 and service B 304 so that both service C 306 and service D 308 would understand that service calls to service E 310 should be redirected to service E' 314 specified by the override endpoint 104. Service E' may then call service F 312 as needed. According to one implementation, the override endpoint 104 may be processed by service A 302 and/or service B 304, such as reformatting, before passing on to service C 306 and service D 308. Alternatively, the override endpoint 104 may be passed on to service C 306 and service D 308 without any change.

As illustrated in FIG. 3, multiple services may be involved in a service call redirection and be affected in a certain way. For instance, service A and service B may need to be configured to recognize the syntax and semantics of the override endpoint 104 and to pass the override endpoint 104 to service C 306 and service D 308 in a proper format. Service C 306 and service D 308 may need to be capable of understanding the received override endpoint 104, and identifying the address of service E' 314 so that they can override the service endpoint for service E 310 and correctly direct the calls to service E' 314. Thus, any service that may be involved in service call redirections needs to be implemented with the capability of properly handling service call redirections or endpoint overrides. As discussed above with regard to FIG. 2, such an implementation may be realized by including a service redirect module 204 in each service. Depending on the architecture of the service-oriented system 120, service redirect modules of services may be implemented in several ways.

Figure 4:
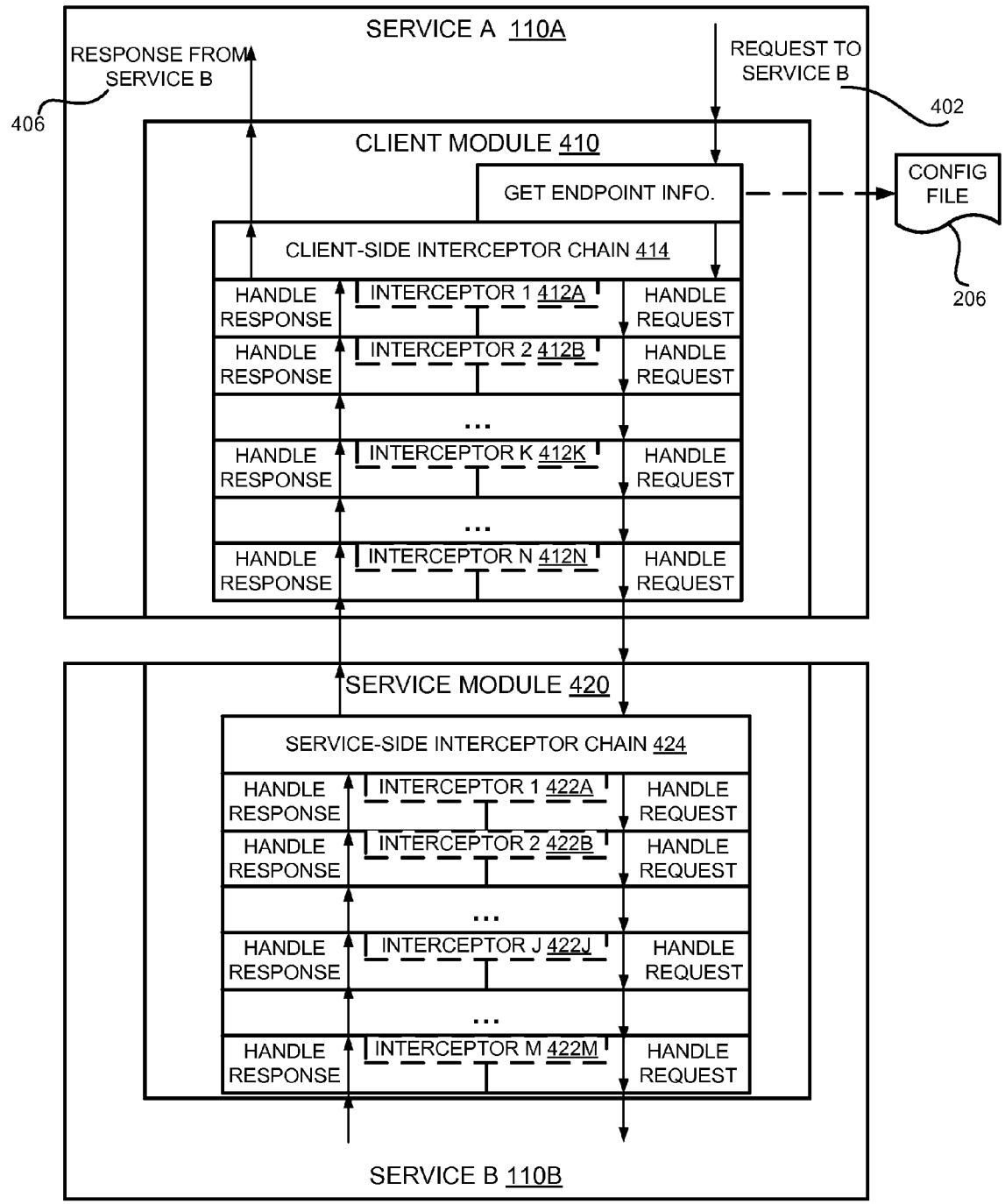
FIG. 4 is a block diagram illustrating an architecture for implementing service call redirections via endpoint overrides in a service-oriented system, according to embodiments presented herein.

FIG. 4 illustrates one mechanism for implementing service redirect modules as interceptors in a system framework of the service-oriented system 120. According to embodiments, a service-oriented system 120 may employ a system framework based on interceptors. Interceptors are the fundamental processing unit inside the system framework of the service-oriented system 120. Multiple interceptors can be built up into chains of interceptors, called "interceptor chains." When a service is invoked by a request, an interceptor chain is created and invoked. Each interceptor in the interceptor chain has a chance to process the request. This may include reading, transforming, processing headers, validating the request, etc.

The system framework for the service-oriented system 120 may provide a client module and a service module for each service. Interceptors may be used with both client modules and service modules. FIG. 4 illustrates a client module 410 at service A 110A containing a client-side interceptor chain 414 and a service module 420 at service B 110B containing a service-side interceptor chain 424. The client-side interceptor chain 414 includes interceptors 412A-412N, and the service-side interceptor chain 424 includes interceptors 422A-422M. When the client module 410 invokes a call to the service module 420, the client-side interceptor chain 414 acts as an outgoing interceptor chain for the client module 410 and the service-side interceptor chain 424 acts as an incoming interceptor chain for the service module 420.

As illustrated in FIG. 4, a service request 402 for the service B may have been received at service A 110A and may be further processed by client module 410. The service request 402 may be the service request 112 or may be derived from the service request 112 by extracting information related to the request to service B, such as a service key 202 of service B and override endpoint 104, if there is any. As discussed briefly above, the client module 410 may use the service key 202 of service B contained in the service request 402 to look into a configuration file 206 to obtain information necessary for connecting to service B 110B, including the service endpoint 208 for the service B 110B. The service request 402 along with the obtained information including the service endpoint 208 and any other information necessary for the service call to service B may then be passed to the outgoing interceptor chain 414 for further processing.

Upon receiving the service request 402 and any other related information, each of the interceptors 412A-412N may perform certain tasks that pertain to the service request 402 before passing the request to the next interceptor in the interceptor chain 414. Example interceptors in the outgoing interceptor chain 414 may include, but are not limited to, an interceptor that adds headers to the service request 402 for transmission, a security interceptor that encrypts the service request 402, an interceptor that logs the outgoing service request 402, and others. The processed service request 402 may then be sent to the service B at the address specified by the service endpoint 208.

Similarly, when the service request 402 is received at the service module 420 of the service B 110B, the service-side incoming interceptor chain 424 may be configured to process the received service request 402. Each interceptor 422A-422M in the service-side interceptor chain 424 may have a chance to process the received service request 402, such as removing the headers of the service request 402, decrypting the service request 402, validating the service request 402, and others. The processed service request 402 may then be sent to service B 110B for fulfillment.

When the service module 420 of service B 110B sends the response 406 back to the client module 410 of service A 110A, the service-side interceptor chain 424 acts as an outgoing chain for the service module 420 and the client-side interceptor chain 414 acts as an incoming chain for the client module 410. Each of the interceptors in the client-side interceptor chain 414 and service-side interceptor chain 424 may perform necessary operations on the response 406 before it is sent back to service A 110A.

To implement the service redirection module 204 discussed above, a new interceptor may be added in the client-side interceptor chain 414 to perform the endpoint overrides. According to embodiments, an interceptor 412K may be added into the client-side interceptor chain 414. The interceptor 412K may analyze the received service request 402 to determine if there is an override endpoint 104 provided for an alternative service B'. If so, the interceptor 412K may override the service endpoint of service B obtained from the configuration file 206, and direct the service connection from service A to a host specified in the override endpoint 104. In one embodiment, the interceptor 412K may replace the service endpoint information obtained from the configuration file 206 with the override endpoint 104 specified in the service request 402 so that any subsequent processing is unaware of the change and may process the service request as normal. Consequently, the request will be delivered to the address of the alternative service B' specified by the override endpoint.

If the requested service is not service B', but instead is a service that is deeper in the call graph than service B and service B', for example service E' 314 in FIG. 3, the service B may need to pass on the override endpoint 104 specified in the service request 402 to service C 306 and service D 308, which may then use the override endpoint 104 to call the requested service E'. In such a scenario, an interceptor may need to be added into the service-side interceptor chain 424 as well, illustrated as interceptor 422J in FIG. 4, to process the service request 402 and to ensure the override endpoint information 104 is passed along correctly. It should be noted that in this case, service B may need to employ its service module (not shown) which may contain a client-side interceptor chain to send the request to service C and service D.

It should be understood that FIG. 4 is provided by way of illustration only and should not be construed as limiting. Other ways of implementing the service redirect module 204 using interceptors and other mechanisms may be possible. It should be further understood that the service redirect module 204 may also be implemented in the system framework of the service-oriented system 120 without utilizing interceptors, such as by hard coding the service redirect module 204 into the system framework, for example, as a standard library. Alternatively, or additionally, the service redirect module 204 may be directly built into each of the services 110. In one embodiment, each of the services 110 involved in endpoint overrides may be modified and hard coded to include the service redirect module 204.

According to embodiments, the service redirect module 204 or the endpoint override functionalities may also be implemented through the network framework of the service-oriented system 120. For instance, load balancers 210 may be utilized to incorporate the endpoint override functionality to determine whether and where to redirect services based on the existence and the content of the override endpoint 104. In this case, the load balancer 210 shown in FIG. 2 may be used to manage both the service hosts 220 running service B and the service host 106X running service B'. The load balancer 210 may receive a request for service B or service B' from service A and direct the service call to one of the service hosts 220 or to service host 106X based on the override endpoint information.

Figure 5:
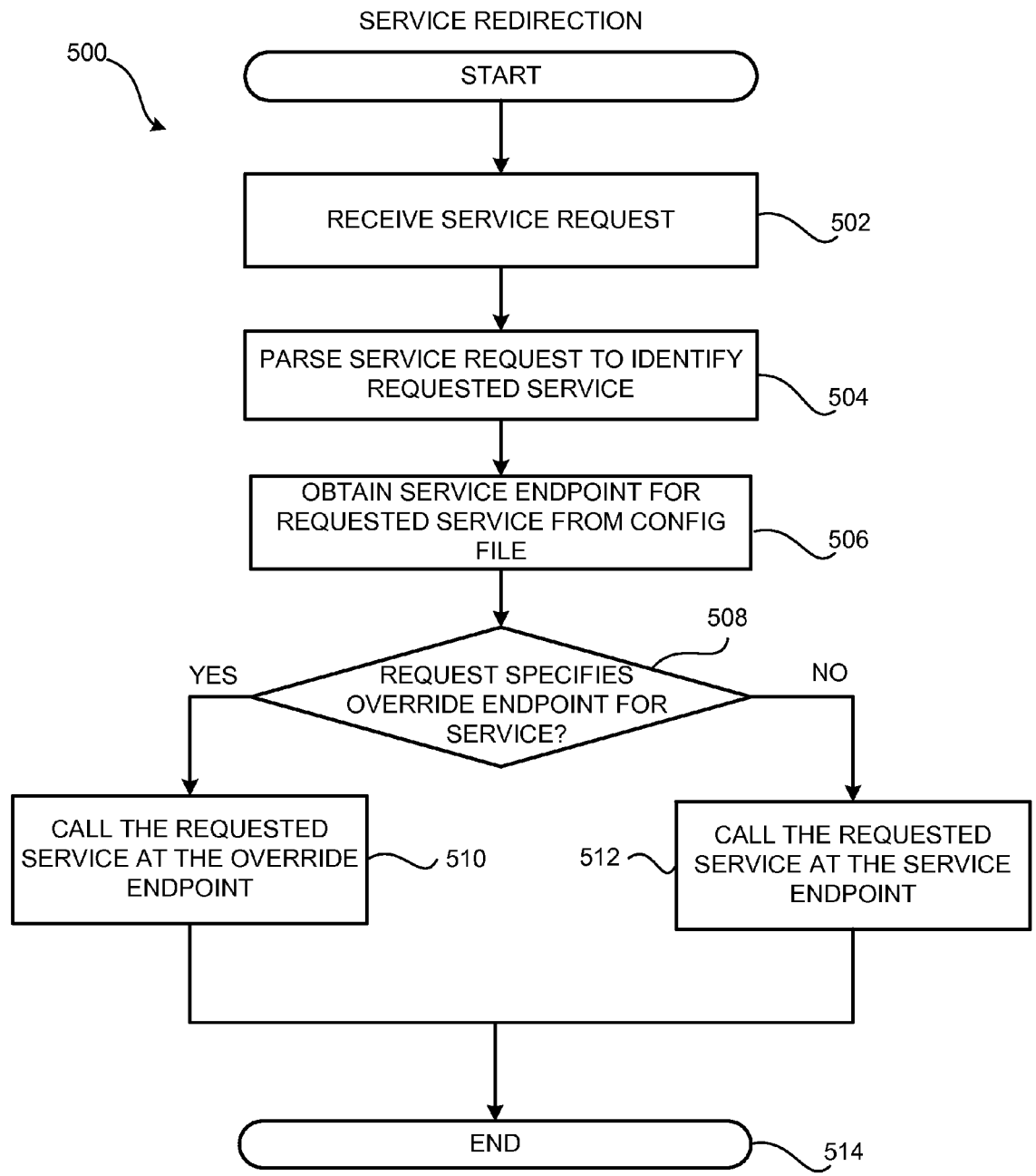
FIG. 5 is a flow diagram showing one illustrative routine for redirecting service calls through endpoint overrides, according to one embodiment disclosed herein.

FIG. 5 is a flow diagram showing one illustrative routine 500 for redirecting service calls through endpoint overrides. In one embodiment, the client module 410 described above in regard to FIG. 4 may perform the routine 500. It should be appreciated, however, that the routine 500 might also be performed by other modules and/or components of a service 110 or by modules and/or components of other entities in the service-oriented system 120.

It should also be appreciated that the logical operations described herein with respect to FIG. 5, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at an optional operation 502, where a service request 112 is received. The routine 500 then proceeds to operation 504, where the service request 112 is parsed or analyzed to identify the requested service. In one embodiment, the requested service may be identified by a service key 202 contained in the service request 112. From operation 504, the routine 500 proceeds to operation 506, where a service endpoint 208 is obtained from a configuration file 206. According to embodiments, the service key 202 contained the service request 112 is employed to identify the service endpoint 208 from the configuration file 206.

The routine 500 then proceeds from operation 506 to operation 508, where a determination is made as to whether the service request 112 specifies an override endpoint 104 for the requested service. If it is determined that the service request 112 does not specify an override endpoint 104, the routine 500 proceeds to operation 512, where the requested service is called at the service endpoint 208; otherwise, the routine 500 proceeds to operation 510, where the service call is redirected to a service specified by the override endpoint 104. From either operation 510 or operation 512, the routine 500 proceeds to operation 514, where it ends.

It should be noted that in the above routine 500, operation 506, i.e. obtaining the service endpoint 208 from the configuration file 206, is performed before the determining operation 508. In an alternative embodiment, obtaining the service endpoint 208 from the configuration file 206 at operation 506 may be performed after it is determined that the service request 112 does not contain the override endpoint 104 and before calling the requested service at operation 512. Similarly, in FIG. 2 and FIG. 4, the service endpoint 208 may also be obtained from the configuration file 206 after it is determined that the service request 112 does not contain the override endpoint 104.

It should be appreciated that while FIGS. 1-5 primarily disclose the use of endpoint overrides for service testing, it should be appreciated that the endpoint overrides might also be suitable for other applications, such as debugging and/or providing alternative services. For instance, one or more errors may have been observed in service B 110B in the service-oriented system 120. The endpoint overrides disclosed above may be utilized to help collect details of the errors for further analysis of possible causes of the errors. To achieve such a goal, service B' 110X may be implemented as a debug version of service B 110B and be incorporated in the service-oriented system 120. Previous services requests causing the errors in service B 110B may now be redirected to service B' 110X by including the override endpoint 104 for service B' in the service request and debugging may then be performed to identify possible causes of the errors.

Endpoint overrides may also be utilized to provide a variety of services to customers of the service-oriented system 120. For example, a service-oriented online merchant system can offer its customers different order processing services transparently via endpoint overrides. For instance, if an order placed by a customer through the online merchant system contains physical items, such as physical books, a retail order processing service may be invoked as a regular service B 110B through regular service calls. On the other hand, upon receiving an order containing digital items, such as digital music, the online merchant system may trigger a call to a digital order processing service as an alternative service B' 110X using endpoint overrides. It should be noted that in this scenario, the alternative service B' may have different functionality from that of service B. It should be appreciated that the above application scenarios are provided by way of example only and should not be construed as limiting.

Figure 6:
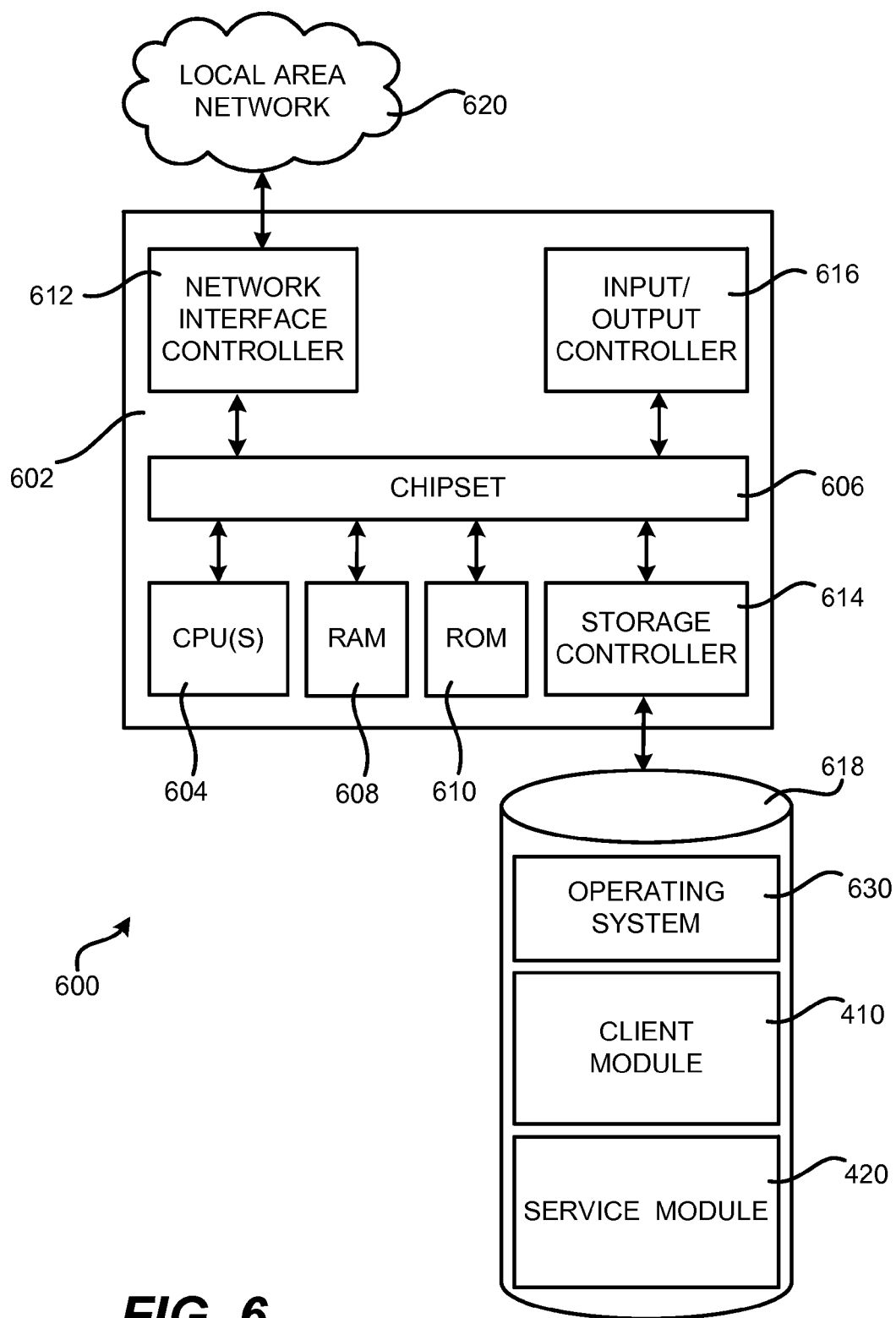
FIG. 6 is a computer architecture diagram showing an illustrative computer hardware architecture for implementing a computing device that might be utilized to implement aspects of the various embodiments presented herein.

FIG. 6 shows an example computer architecture for a computer 600 capable of executing the program components described above for redirecting service calls using endpoint overrides. The computer architecture shown in FIG. 6 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 6 may be utilized to execute one or more services 110 shown in FIGS. 1-4 and described above.

The computer 600 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a random access memory ("RAM") 608, used as the main memory in the computer 600. The chipset 606 may further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM may also store other software components necessary for the operation of the computer 600 in accordance with the embodiments described herein.

The computer 600 may operate in a networked environment using logical connections to remote computing devices and computer systems through a network, such as the local area network 620. The chipset 606 may include functionality for providing network connectivity through a network interface controller 612 ("NIC"), such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 618 may store other system or application programs and data utilized by the computer 600, such as the client module 410, the service module 420, and/or any of the other software components and data described above. The mass storage device 618 might also store other programs and data not specifically identified herein.

In one embodiment, the mass storage device 618 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the routine described above with regard to FIG. 5. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing endpoint redirects been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for redirecting service calls in a service-oriented system, the method comprising executing instructions in a computer system to perform the operations of:
    receiving a request for a service implemented by the service-oriented system, wherein the request comprises a service key to identify an endpoint for the service;
    determining if the request includes an override endpoint for the service in addition to the service key;
    in response to determining that the request includes the override endpoint for the service in addition to the service key, calling the service at the override endpoint for the service instead of calling the service at the endpoint for the service; and
    in response to determining that another request comprises the service key to identify the endpoint for the service and does not include the override endpoint for the service, calling the service at the endpoint for the service.

2. The computer-implemented method of claim 1, wherein an address of the service comprises one or more of a host identification, a port number, or a path for the service.

3. The computer-implemented method of claim 1, wherein the service specified by the endpoint implements a first version of the service, and wherein the service specified by the override endpoint implements a second version of the service.

4. The computer-implemented method of claim 3, wherein the service specified by the override endpoint is a test version of the service specified by the endpoint.

5. The computer-implemented method of claim 3, wherein the service specified by the override endpoint is a debug version of the service specified by the endpoint.

6. The computer-implemented method of claim 1, wherein the service specified by the override endpoint provides functionality that is different than functionality provided by the service specified by the endpoint.

7. A computer system, comprising:
    one or more computer processors of a distributed service-oriented system storing instructions that, when executed by at least one of the one or more computer processors, configure the one or more computer processors to:
    receive a request for a service, wherein the service is provided at an endpoint for the service;
    determine if the request includes an override endpoint for the service in addition to the service key; and
    in response to determining that the request includes the override endpoint for the service in addition to the service key, call the service at the override endpoint for the service instead of calling the service at the endpoint for the service.

8. The computer system of claim 7, wherein the one or more computer processors are further configured to implement an interceptor, and wherein said determining and said calling the service at the override endpoint are performed by the interceptor.

9. The computer system of claim 7, further comprising one or more load balancers connected to at least one of the one or more computer processors, wherein the endpoint comprises an address of one of the load balancers corresponding to the service.

10. The computer system of claim 7, wherein each of the endpoint and the override endpoint comprises an address represented by one or more of a host identification, a port number or a path of the service.

11. The computer system of claim 10, wherein a host is a computing device, and wherein a computing device specified in the endpoint is different from a computing device specified in the override endpoint.

12. The computer system of claim 7, wherein the service specified by the override endpoint is a test version of the service specified by the endpoint.

13. The computer system of claim 7, wherein the service specified by the override endpoint is a debug version of the service specified by the endpoint.

14. The computer system of claim 7, wherein the service specified by the override endpoint provides functionality that is different than functionality provided by the service specified by the endpoint.

15. A computer-readable storage medium having computer-executable instructions stored thereupon which, when executed by a computer, cause the computer to:
    determine if a request for a service implemented by a service-oriented system includes an override endpoint for the service in addition to the service key;
    in response to determining that the request includes the override endpoint for the service in addition to the service key, call the service at the override endpoint for the service instead of calling the service at the endpoint for the service; and
    in response to determining that another request comprises the service key to identify the endpoint for the service and does not include the override endpoint for the service, call the service at another endpoint for the service.

16. The computer-readable storage medium of claim 15, wherein the computer-readable storage medium comprises further computer executable instructions which, when executed by the computer, cause the computer to analyze the request to identify a service key for the service, and wherein the endpoint is obtained using the service key.

17. The computer-readable storage medium of claim 15, wherein each of the endpoint and the override endpoint comprises an address represented by one or more of a host identification, a port number or a path of the service.

18. The computer-readable storage medium of claim 15, wherein the service specified by the override endpoint is a test version of the service specified by the endpoint.

19. The computer-readable storage medium of claim 15, wherein the service specified by the override endpoint is a debug version of the service specified by the endpoint.

20. The computer-readable storage medium of claim 15, wherein the service specified by the override endpoint provides different functionality than the service specified by the endpoint.

* * * * *